United States Patent
Syfko

(10) Patent No.: US 10,968,013 B2
(45) Date of Patent: Apr. 6, 2021

(54) GLAZING PANEL CONDITIONING

(71) Applicant: Belron International Limited, Egham (GB)

(72) Inventor: Paul Syfko, Westerville, OH (US)

(73) Assignee: Belron International Limited, Egham (GB)

( * ) Notice: Subject to any disclaimer, the term of this patent is extended or adjusted under 35 U.S.C. 154(b) by 321 days.

(21) Appl. No.: 15/868,808

(22) Filed: Jan. 11, 2018

(65) Prior Publication Data
US 2018/0127157 A1   May 10, 2018

Related U.S. Application Data

(62) Division of application No. 13/505,311, filed as application No. PCT/EP2010/067087 on Nov. 9, 2010, now Pat. No. 9,868,567.

(30) Foreign Application Priority Data

Nov. 16, 2009 (GB) ..................... 0919975

(51) Int. Cl.
| B65D 35/14 | (2006.01) |
| B29C 73/02 | (2006.01) |
| B29C 73/24 | (2006.01) |
| B65D 77/04 | (2006.01) |
| C03C 17/28 | (2006.01) |
| C09D 5/00 | (2006.01) |
| B32B 17/10 | (2006.01) |

(52) U.S. Cl.
CPC ............ *B65D 35/14* (2013.01); *B29C 73/025* (2013.01); *B29C 73/24* (2013.01); *B32B 17/10963* (2013.01); *B65D 77/0406* (2013.01); *B65D 77/0486* (2013.01); *C03C 17/28* (2013.01); *C09D 5/002* (2013.01)

(58) Field of Classification Search
None
See application file for complete search history.

(56) References Cited

U.S. PATENT DOCUMENTS

| 3,993,520 A | 11/1976 | Werner et al. |
| 4,020,978 A | 5/1977 | Szczepanski |
| 4,076,027 A | 2/1978 | Koenig |
| 4,304,869 A | 12/1981 | Dyke |

(Continued)

FOREIGN PATENT DOCUMENTS

| EP | 1923361 | 5/2008 |
| FR | 1240239 | 9/1960 |

(Continued)

OTHER PUBLICATIONS

"Hydrolysis, adsorption, and dynamics of silane coupling agents on silica surfaces," Journal of Adhesion Science and Technology 5(6), Blum et al., pp. 479-496, Jun. 1991.

*Primary Examiner* — Colin W. Slifka
(74) *Attorney, Agent, or Firm* — Gordon & Jacobson, P.C.

(57) ABSTRACT

A conditioning agent (typically for use in repairing a flaw in a glazing panel) is contained in a sealed container which is itself disposed internally of a flexible outer walled container. Pressure applied to the outer flexible walled container can cause release of the conditioning agent from the internal conditioning agent container. The conditioning agent preparation may comprise a hygroscopic solvent (such as acetone) combined with one or more primer additives to prime the surface of the glazing panel for repair.

4 Claims, 1 Drawing Sheet

(56) References Cited

U.S. PATENT DOCUMENTS

| | | |
|---|---|---|
| 5,122,042 A | 6/1992 | Einiger |
| 5,451,345 A | 9/1995 | Hatton et al. |
| 6,254,297 B1 | 7/2001 | Frazier |
| 9,868,567 B2 | 1/2018 | Syfko |
| 2002/0037964 A1 | 3/2002 | Miyata et al. |
| 2003/0111159 A1 | 6/2003 | Hashimoto et al. |
| 2004/0035880 A1 | 2/2004 | Coleman |
| 2005/0191113 A1 | 9/2005 | Frazier |
| 2008/0156414 A1 | 7/2008 | Campfield |
| 2008/0199618 A1 | 8/2008 | Wen et al. |
| 2009/0162592 A1 | 6/2009 | Baikerikar et al. |

FOREIGN PATENT DOCUMENTS

| | | |
|---|---|---|
| JP | H05177782 | 7/1993 |
| JP | H09183467 | 7/1997 |
| JP | 2002294160 A2 | 10/2002 |
| JP | 2003313207 | 11/2003 |
| WO | WO9912859 A1 | 3/1999 |
| WO | WO9933906 A1 | 7/1999 |
| WO | WO01/34373 | 5/2001 |

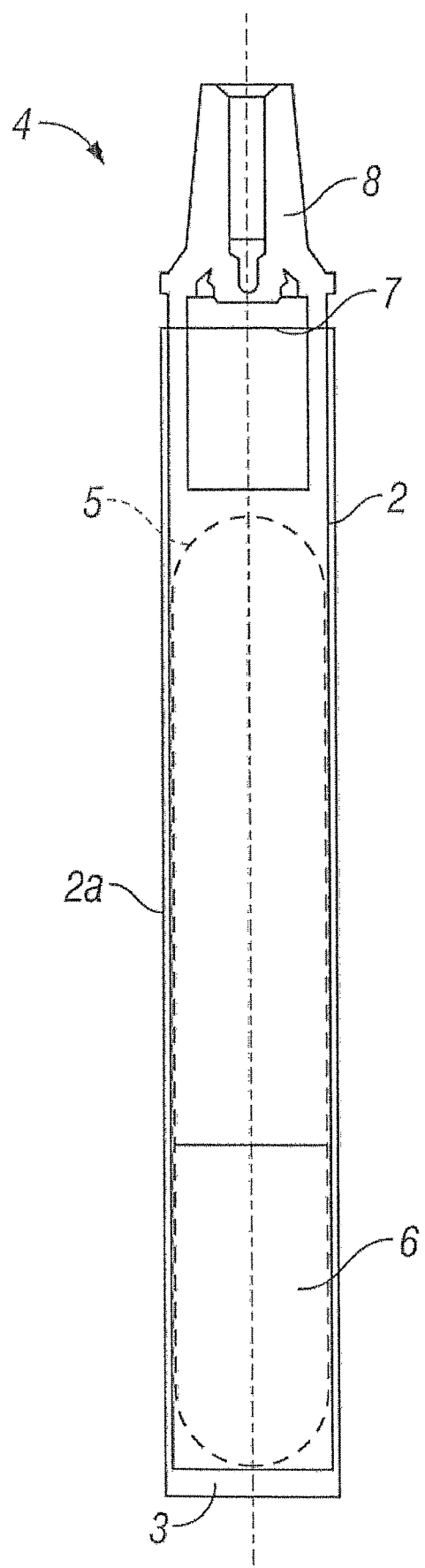

GLAZING PANEL CONDITIONING

CROSS-REFERENCE TO RELATED APPLICATIONS

This application is a divisional of U.S. Applications No. 13,505,311, filed May 1, 2012, now U.S. Pat. No. 9,868,567, which is the national stage entry of PCT/EP/2010/067087, filed on Nov. 9, 2010, which claims priority to GB 0919975.3, filed on Nov. 16, 2009, all of which are hereby incorporated by reference herein in their entireties

BACKGROUND

1. Field

The present invention relates to Conditioning of Glazing Panels, particularly to conditioning of glazing panels for repair.

2. Related Art

Breaks, cracks or chips in glazing panels (referred to in general as flaws) can be repaired using repair devices such as vacuum repair devices similar to that disclosed in WO-A-0134373. A resin is introduced into the flaw (i.e. the chip, crack or break) and the vacuum apparatus de-gases the resin and the flaw. In order to enhance the quality of the repair it is known to treat the flaw with acetone in order to remove as much moisture as possible from the flaw, prior to filling with resin and application of the vacuum. The acetone mixes with any moisture in the flaw and enhances evaporation. Water in the flaw during repair is detrimental to the quality of the repair process. Problems can arise if the acetone (which is hygroscopic) has been contaminated by moisture prior to use.

SUMMARY

An improved technique and device has been devised for delivering, storing and using agents for conditioning flaws or breaks in glazing panels, preparatory to conducting a repair process.

According to a first aspect, the present invention provides a device for use in conditioning glazing panels for repair, the device comprising a conditioning agent contained in a sealed internal conditioning agent container; the conditioning agent container being disposed internally of a flexible outer walled container; wherein pressure applied to the outer flexible walled container can cause release of the conditioning agent from the internal conditioning agent container.

Typically the integrity of the internal container is compromised (in order to cause release of the conditioning agent from the internal conditioning agent container) without the structural integrity of the flexible outer walled container being compromised.

It is preferred that the sealed internal conditioning agent container is effectively impermeable (substantially water impermeable) so as to prevent ingress of moisture into the container to mix with the conditioning agent.

Typically, manual pinch pressure (between index finger and thumb) applied to flex the wall of the outer container can cause rupture or fracture of the sealed internal conditioning agent container, leading to release of the conditioning agent from the internal conditioning agent container.

The internal conditioning agent container preferably comprises a frangible/fracturable walled container, preferably a glass vial.

The outer flexible walled container comprises a plastics material.

It is preferred that the internal sealed conditioning agent container is disposed internally of a flexible outer walled container in a snug fit relationship in which the wall of the outer container is contiguous with the wall of the internal sealed conditioning agent container. This prevents the conditioning agent container from moving with respect to the outer container which could otherwise result in damage to the conditioning agent container.

Beneficially, the outer container and inner sealed conditioning agent container are elongate containers, preferably arranged coaxially.

It is preferred that the inner sealed conditioning agent container extends along the majority of the length of the outer container.

Preferably, the outer flexible walled container is provided with an outlet (preferably a nozzle) permitting dispensing of the conditioning agent to externally of the device.

It is preferred that in the event of the internal conditioning agent container becoming ruptured, the conditioning agent can flow through the opening in the outer container, but ruptured fragments of the internal conditioning agent container are retained within the outer container.

Beneficially, the outer container comprises a closure portion bonded to a receptacle portion in order to secure the internal conditioning agent container within the interior of the outer container. Beneficially, the closure portion extends to close by the end of the internal conditioning agent container.

In certain embodiments, it is preferred that the closure portion comprises a nozzle.

It is preferred that the conditioning agent comprises a solvent (more preferably a hygroscopic solvent). In certain realisations, the conditioning agent comprises acetone.

Additionally, in certain embodiments the conditioning agent includes a solvent and one or more primer additives to prime the surface of the glazing panel for repair.

The primer additive may in certain embodiments comprise a material to coat the glazing panel surface to promote flow of a repair resin.

The primer additive may in certain embodiments comprise a material to coat the glazing panel surface to promote polymer cross linking to improve the bond strength of a repair resin.

In certain embodiments, the interior of the outer container is permanently in communication with the external ambient atmosphere of the device.

According to second aspect, the invention provides a method of manufacturing a device according to any preceding claim, wherein a conditioning agent is sealed in a conditioning agent container; and the conditioning agent container being disposed internally of a flexible outer walled container.

Preferred features of this aspect of the invention are in accordance with those earlier described.

According to a further aspect, the invention provides a method of repairing a flaw in a glazing panel, the method comprising:
 using a device according to any preceding claim to dispense a conditioning agent into the flaw;
 dispensing a repair material into the flaw to affect a repair.

According to a further aspect, the invention provides a conditioning agent preparation for use in conditioning glazing panels for repair, the conditioning agent preparation comprising a hygroscopic solvent (such as acetone) combined with one or more primer additives to prime the surface of the glazing panel for repair.

BRIEF DESCRIPTION OF THE DRAWING

The FIGURE is a schematic representation of a device in accordance with the invention.

DETAILED DESCRIPTION OF THE PREFERRED EMBODIMENTS

Referring to the drawing, there is shown in the FIGURE a conditioning agent delivery system/dispenser in the form of an ampoule 1 comprising an elongate plastics flexible walled tube 2 having a closed end 3 and a nozzle end 4. Internally of the flexible walled plastics tube 2 is positioned an elongate frangible glass vial 5 arranged coaxially within the plastics outer tube. The frangible glass vial 5 is effectively a sealed internal container and contains a conditioning agent 6, typically in liquid form, as will be described in greater detail.

The internal sealed conditioning agent container vial 5 is disposed internally of the flexible outer walled tube 2 in a snug fit relationship in which the wall of the outer tube 2 is contiguous with the wall of the internal sealed conditioning agent vial 5 along the majority of the length of the device. This prevents the conditioning agent vial 5 from moving with respect to the outer tube 2 which could otherwise result in accidental fracture of the conditioning agent vial 5.

The flexible walled plastics tube 2 is manufactured in two-part form. A receptacle tube portion 2a has an open end 3, at the end of the tube opposite the closed end 3. The nozzle component 8 is arranged to seat within the open end 3 of the receptacle tube portion 2a. During manufacture the frangible glass vial 5 containing the conditioning agent 6 is placed into the interior of the flexible walled plastics tube 2 via the open end 7 of the tube. The nozzle component 8 is then seated into the open end 7 of the tube 2 and ultrasonically or thermally welded. Typically the nozzle component 8 is made of more rigid plastics material than the receptacle tube portion 2a.

The arrangement is such that when pinching finger pressure is applied to the longitudinal sidewalls of the flexible walled plastics tube 2, the frangible glass vial 5 is caused to fracture and the liquid form conditioning agent can pass out of the nozzle component 8 of the dispenser ampoule 1 to be delivered to the glazing panel flaw as required. The frangible glass vial 5 is therefore of thin walled glass and may for example be soda glass. A filter may be provided to prevent shards of glass passing via the nozzle component however appropriate glass selection can make the need for such a filter superfluous.

Typically the conditioning agent 6 will comprise an acetone mixture or solution. Acetone is known to be useful in enhancing evaporation and so driving moisture out of glazing panel flaws and delivery in the dispenser device of the invention aids in ensuring that the agent is ready for use and unlikely to be contaminated by ingress of moisture into the agent in the ampoule 1 during any (possibly lengthy) period of storage. The frangible glass vial 5 provides a moisture barrier and encapsulation within the dispenser in the form of the flexible walled plastics tube 2 enables the glass to be fractured and dispensing of the agent to be achieved in a safe and efficient manner, without glass fragments being dispensed from the device. The device is one shot and the conditioning agent is factory dosed and environmentally sealed. The device provides a storage and transportation container and also a dispenser/applicator device.

In certain embodiments it is preferred that the drying agent, typically a solvent (exemplified as acetone) is utilised in combination with a primer agent which is intended to, and capable of, carrying out a priming interaction with the glazing panel flaw. The priming interaction may comprise coating the surface of the flaw in a material that improves the curing of the in-filler resin, enhances the flow of the resin, or interacts with the resin to improve the adhesive strength.

In an exemplary embodiment the solution comprises 99.2% solvent (acetone) and approximately less than 1% primer agents (for example 0.4% Acrylic Acid and 0.4% Methacryloxy Silane). Following application to the flaw, the acetone in the flaw is evaporated leaving the primer chemicals behind. The primer chemicals coat the inside surface of the flaw. In addition to enhancing the flow of resin to fully penetrate the flaw, the primer chemicals react and crosslink with the resin to improve the overall adhesive strength (increasing this by 15-18% in trials).

Other solvent variations were tried but found not to provide an optimum solution. For example Ethanol and Methanol are good solvents for water removal. However, both solvents dissolve the PVB interlayer which is typically present in a laminated vehicle windscreen, and accordingly are less preferred.

Other chemical additives were also tried. 1%, 0.5% and 0.25% windshield repair resin was tried as an additive in the Acetone. All three mixtures showed minimal benefit with respect to adhesion and wetting. It is suggested that the problem was that the resin in the solution contained photo-initiators and was therefore subject to shelf life concerns as the ampoule allowed UV thru. Organo silane and Acrylic Acid additives were also experimented with.

The silane is a coupling agent and chemically bonds to the glass surface and crosslinks into the resin polymer, increasing the adhesion of the resin. The acrylic acid also bonds to the glass and acts as an accelerator in the silane bonding process. 2%, 1% and 0.5% Organo Silane/Acrylic Acid in Acetone were tried.

The best results were at the 1% level. 0.8% was selected as optimum in order to keep the level of Acrylic Acid <0.5% which was found to have beneficial results.

Following the application of the conditioning agent to the flaw, and elapsing of sufficient time to permit the moisture in the flaw to evaporate/be driven off, the repair can be conducted by causing resin to infill and cure in the flaw. For this purpose a vacuum repair device such as shown in WO01/343373 can be used.

Tests were conducted to compare the effect of various structural and other parameters.

1. Shelf Life

A test was conducted to determine the amount of moisture or water contained in a dry-out solution sample (Acetone).

Acetone is a hygroscopic material, i.e. it likes to absorb water from its environment.

Sample #1 control-new acetone straight from the bottle—0.3% water

Sample #2 Acetone stored in plastic bottle. Sample was stored in warehouse for 4 months—6.8% water.

Sample #3 Acetone in Glass ampoule. Sample was stored in warehouse for 4 months—0.33% water 2. Adhesion
   Testing was performed to determine the effect of the primer in the dry-out solution.
   Adhesion promoters were added to dry-out solution.
   Solution was applied to glass and allowed to evaporate. Glass sample were adhered with HPX-II resin. The lap shear strength was measured.
   Sample #1 Control—3350 psi
   Sample #2 Uncontrolled Acetone from hardware store (contamination)—2178 psi
   Sample #3 Primer in glass ampoule—3982 psi
3. Wetting and Flow Characteristics
   A test was conducted to determine if the primer solution affected the way the resin interacts with the glass surface.
   The contact angle of the resin on the glass was measured to determine wetting/flow.

| Surface | Initial Angle | Angle at 50 seconds |
|---|---|---|
| Unprimed Glass | 22 | 13 |
| Primed Glass | 16 | 9 |

Results indicate that the primed sample had a much lower contact angle then the control (untreated). This means that the primer does aid in wetting and improves the resin flow properties.

The results clearly indicate that there are technical advantages to using the dry-out in the ampoules. The addition of the primer also adds to the performance of the resin.

What is claimed is:

1. A method of conditioning a flaw in a glazing panel in preparation of repairing the flaw, the method comprising:
   applying a preparation agent to a surface of the glazing panel to prime the surface of the glazing panel for repair, the preparation agent comprising a hygroscopic solvent combined with one or more primer additives;
   wherein the hygroscopic solvent comprises acetone, the one or more primer additives comprise acrylic acid and an organosilane material, and the one or more primer additives are one percent or less by volume of the preparation agent.

2. A method according to claim 1, wherein:
   the one or more primer additives comprise a chemical to coat the glazing panel surface to promote flow of a repair resin.

3. A method according to claim 1, wherein:
   the one or more primer additives comprise a chemical to coat the glazing panel surface to promote cross linking to improve the bond strength of a repair resin.

4. A method according to claim 1, wherein:
   the one or more primer additives comprise 0.4% or less by volume acrylic acid.

* * * * *